United States Patent
Iwamoto et al.

(10) Patent No.: US 11,256,843 B2
(45) Date of Patent: Feb. 22, 2022

(54) COMPUTER READABLE STORAGE MEDIUM AND METHOD OF FORMING ELECTRONIC CIRCUIT DIAGRAM

(71) Applicant: CASIO COMPUTER CO., LTD., Tokyo (JP)

(72) Inventors: Kenji Iwamoto, Kokubunji (JP); Masato Mochizuki, Hachioji (JP); Junichi Ono, Higashikurume (JP); Katsunori Suzuki, Higashimatsuyama (JP); Yuji Horiuchi, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 100 days.

(21) Appl. No.: 16/523,602

(22) Filed: Jul. 26, 2019

(65) Prior Publication Data
US 2020/0034505 A1 Jan. 30, 2020

(30) Foreign Application Priority Data
Jul. 30, 2018 (JP) .............................. JP2018-142881
Jun. 6, 2019 (JP) .............................. JP2019-105955

(51) Int. Cl.
*G06F 30/39* (2020.01)
*H05K 3/12* (2006.01)
*H05K 3/00* (2006.01)

(52) U.S. Cl.
CPC ........... *G06F 30/39* (2020.01); *H05K 3/0005* (2013.01); *H05K 3/125* (2013.01)

(58) Field of Classification Search
CPC ...... G06F 30/39; G06F 2115/12; G06F 30/31; H05K 3/125; H05K 3/0005; H05K 2203/0264; H05K 1/119; H05K 2201/10053; H05K 1/111; H05K 2203/161; H05K 2201/09045; H05K 2203/1105; H05K 3/0014; B41M 3/06
See application file for complete search history.

(56) References Cited

U.S. PATENT DOCUMENTS

2005/0076824 A1 4/2005 Cross et al.
2016/0216748 A1* 7/2016 Jenkins ............... H01L 23/3675

FOREIGN PATENT DOCUMENTS

JP 2000223795 A 8/2000
JP 2001042763 A 2/2001
(Continued)

*Primary Examiner* — Nha T Nguyen
(74) *Attorney, Agent, or Firm* — Holtz, Holtz & Volek PC

(57) ABSTRACT

There is provided a computer readable storage medium storing a program executable by a computer, and the program causes the computer to execute functions including: forming a first image in accordance with an electronic circuit diagram, in which a resistance value of a wiring portion is defined, to form the wiring portion by printing with a conductive ink; and correcting the first image in accordance with a second image, which is formed with a photothermal conversion material, when the first image is formed at least partially overlapping the second image, wherein the second image is an image for expanding a thermally expandable layer that thermally expands with heat and, when the image is irradiated with light, expanding the thermally expandable layer by converting the light into heat with the photothermal conversion material.

9 Claims, 14 Drawing Sheets

(56) References Cited

FOREIGN PATENT DOCUMENTS

| JP | 2001113826 | * | 4/2001 |
|---|---|---|---|
| JP | 2007508618 A | | 4/2007 |
| JP | 2014003107 A | | 1/2014 |
| JP | 2017052295 A | | 3/2017 |

* cited by examiner

COMPUTER READABLE STORAGE MEDIUM AND METHOD OF FORMING ELECTRONIC CIRCUIT DIAGRAM

BACKGROUND

1. Technical Field

The present invention relates to a program, a conductive circuit, and a method of creating a conversion diagram used in creating the conductive circuit.

2. Related Art

Conventionally, at the production site of a conductive circuit to produce, for example, a flexible wiring board described in JP 2000-223795 A, a creator first uses a computer-aided design (CAD) device to create an electronic circuit diagram (e.g., see FIG. 13A). Next, the creator obtains a base material and processes the base material with a dedicated machine to produce a flexible wiring board (e.g., see FIG. 13B). FIG. 13A illustrates an exemplary electronic circuit diagram 100 created by the CAD device, and FIG. 13B is a view illustrating an example of the flexible wiring board 300.

In a case where a circuit is produced using a universal board described in JP 2001-42763 A, a creator manually connects the solder.

SUMMARY

At the production site of the conductive circuit, it has been desired to provide a circuit board having a wiring function similar to the wiring function of the flexible wiring board or the universal board, inexpensive, and capable of being produced quickly and easily.

For example, in the production of the flexible wiring board described in JP 2000-223795 A mentioned above, the electronic circuit diagram is created by the computer-aided design (CAD) device, and the base material is obtained and processed by a dedicated machine to produce a flexible wiring board. Thus, the production of the flexible wiring board can only be achieved by a person having expertise, and is a time-consuming process. Further, additional costs, such as a material cost and an equipment cost, are needed for the production of the flexible wiring board. Therefore, it has been difficult to produce more than one kind of flexible wiring boards. When the evaluation result of the operation of the produced flexible wiring board is not preferable, the creator has to repeat the similar operation, which requires a large cost and a long production time.

Further, for example, in the case of creating a circuit using the universal board described in JP 2001-42763 A mentioned above, the creator manually connects the solder. Therefore, creating the circuit using the universal board imposes a burden on the creator and requires a long preparation time. In addition, when the evaluation result of the operation of the created circuit is not preferable, the creator has to form the circuit again, which requires a large cost and a long production time.

It is an object of the present invention to provide a circuit board having a wiring function similar to the wiring function of a flexible wiring board or a universal board, inexpensive, and capable of being produced quickly and easily.

To solve the above problem, a program according to a first aspect of the present invention is configured to cause a computer to create, on the basis of circuit diagram data, conversion diagram data in which a part or all of wires included in the circuit diagram data is converted into a portion to be formed with a conductive ink having a conductive characteristic, and to form the portion of the wires to be formed with the conductive ink in a pattern corresponding to a resistance value of the wires.

According to the present invention, it is possible to provide a circuit board having a wiring function similar to the wiring function of the flexible wiring board or the universal board, inexpensive, and capable of being created quickly and easily.

DETAILED DESCRIPTION

Figure 1A:
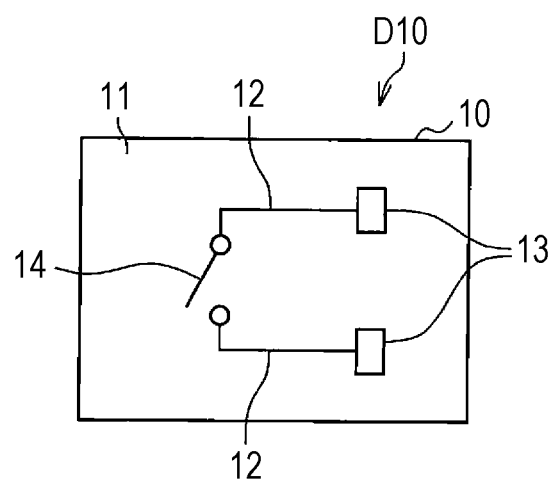
FIG. 1A illustrates a configuration of an electronic circuit diagram from which a conductive circuit according to an embodiment is formed.

Embodiment of the present invention (hereinafter, referred to as "the present embodiment") will be described below in detail with reference to the accompanying drawings. The drawings illustrate the present invention only schematically to the extent that the present invention can be sufficiently understood. Therefore, the present invention is not limited to the illustrated examples. In the drawings, the same symbols are given to common or similar constituent components through the drawings, and the description thereof will not be repeated.

Embodiment

<Configuration of Conductive Circuit>

Figure 1B:
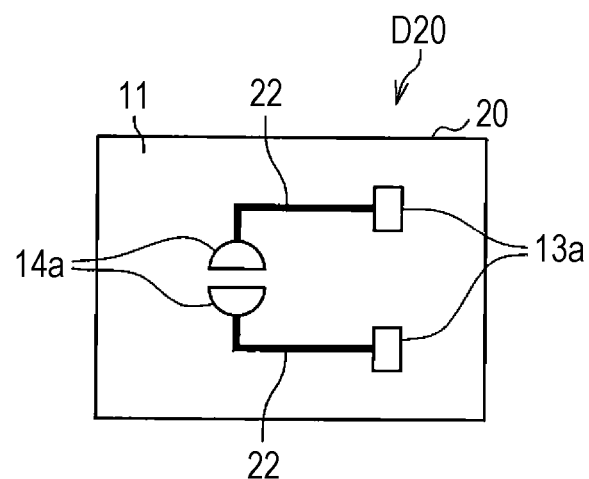
FIG. 1B illustrates a configuration of a conversion diagram used to create a conductive circuit according to the embodiment.
Figure 1C:
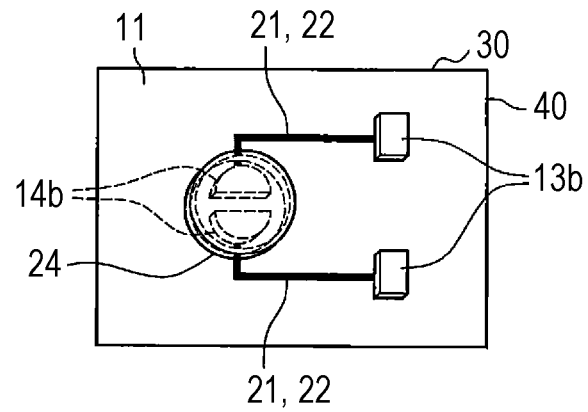
FIG. 1C illustrates the configuration of a conductive circuit according to the embodiment.

Hereinafter, the configuration of a conductive circuit 30 (see FIG. 1C) according to the present embodiment will be described with reference to FIGS. 1A to 1C. FIG. 1A illustrates the configuration of an electronic circuit diagram 10 on the basis of which the conductive circuit 30 is formed. FIG. 1B illustrates the configuration of a conversion diagram 20 used to create the conductive circuit 30. FIG. 1C illustrates the configuration of the conductive circuit 30.

As illustrated in FIG. 1A, the creator of the conductive circuit 30 (see FIG. 1C) prepares electronic circuit diagram data D10 of an electronic circuit diagram 10 which is previously designed. In the example illustrated in FIG. 1A, the electronic circuit diagram 10 of the electronic circuit diagram data D10 includes a circuit 11 in which wires 12 are formed between a switch 14 and two connection terminals 13.

Next, as illustrated in FIG. 1B, the creator creates, for example, a conversion diagram 20 on the basis of the electronic circuit diagram 10 using a computer 101 (see FIG. 5A) which is described later. In the example illustrated in FIG. 1B, when compared to the electronic circuit diagram 10 of the electronic circuit diagram data D10, the conversion diagram 20 of the conversion diagram data D20 is configured such that the wires 12, the connection terminals 13, and the switch 14 are converted to wires 22, connection terminals 13a, and switches 14a, respectively.

The wires 22 represent the shape of wire (wire forming portion) made of black ink 21 (see FIG. 1C) which is described later. Typically, the black ink 21 is a conductive ink including conductive carbon black.

The connection terminals 13a and the switches 14a indicate the shape of terminals and switches formed by expanding a thermally expandable layer 42 of a sheet material 40 which is described later (see FIG. 2A).

Next, for example, as illustrated in FIG. 1C, the sheet material 40 is used to create the conductive circuit 30. The conductive circuit 30 is a circuit created on the basis of the conversion diagram data D20.

As illustrated in FIG. 1C, the conductive circuit 30 includes two connection terminals 13b and two protrusions 14b. The conductive circuit 30 is formed by printing the wires 22 on the sheet material 40 with the black ink 21 (conductive ink) between the connection terminals 13b and the protrusions 14b. In the conductive circuit 30, a switch member 24 is disposed on the protrusions 14b. The switch member 24 is made of metal and is conductive.

The connection terminals 13b and the protrusions 14b are formed three-dimensionally by expanding portions of the sheet material 40 corresponding to the connection terminals 13a and the switches 14a of the conversion diagram data D20 (see FIG. 1B). The connection terminals 13a and the switches 14a (especially the switches 14a) are elastic. The switch member 24 disposed on the switches 14a moves up and down, when pressed, to be electrically connected to or disconnected from the wires 22.

Such a conductive circuit 30 forms an operation circuit only by mounting the switch member 24 on the protrusions 14b. Note that the electronic circuit diagram 10, the conversion diagram 20, and the conductive circuit 30 illustrated in the drawings are merely examples, and can be changed to various patterns according to the operation.

<Configuration of Sheet Material on which Conductive Circuit is Formed>

When heated, the sheet material 40 used in the present embodiment can expand a portion on which a photothermal conversion ink 45 (see FIG. 3A) which is described later is printed.

The structure of the sheet material 40 in which the conductive circuit 30 is formed (see FIG. 1C) is described below with reference to FIGS. 2A and 2B. FIG. 2A illustrates the structure of the sheet material 40 used to create the conductive circuit 30 (see FIG. 1C). FIG. 2B illustrates the structure of a thermally expandable material used for the thermally expandable layer 42 (see FIG. 2A) of the sheet material 40. FIG. 2B illustrates in an enlarged manner a region Ar of the thermally expandable layer 42 of FIG. 2A.

Figure 2A:
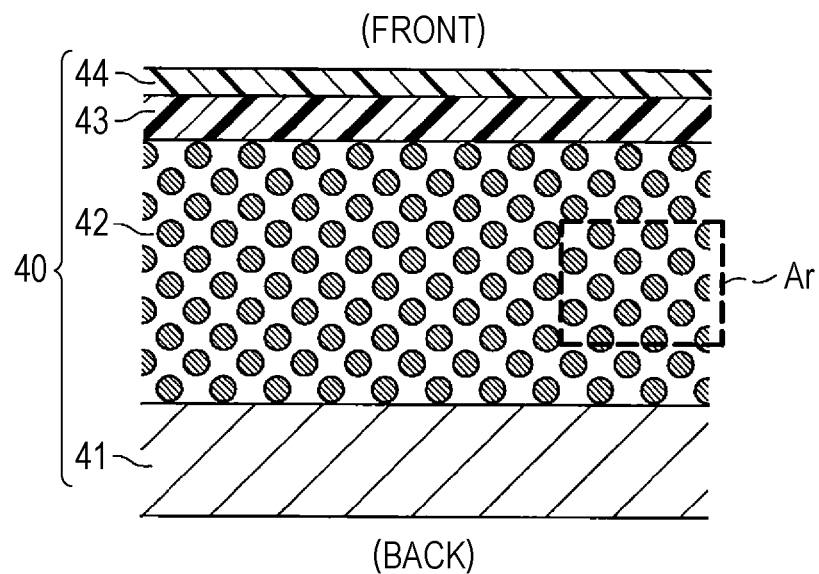
FIG. 2A illustrates the structure of a sheet material used in creating a conductive circuit.
Figure 2B:
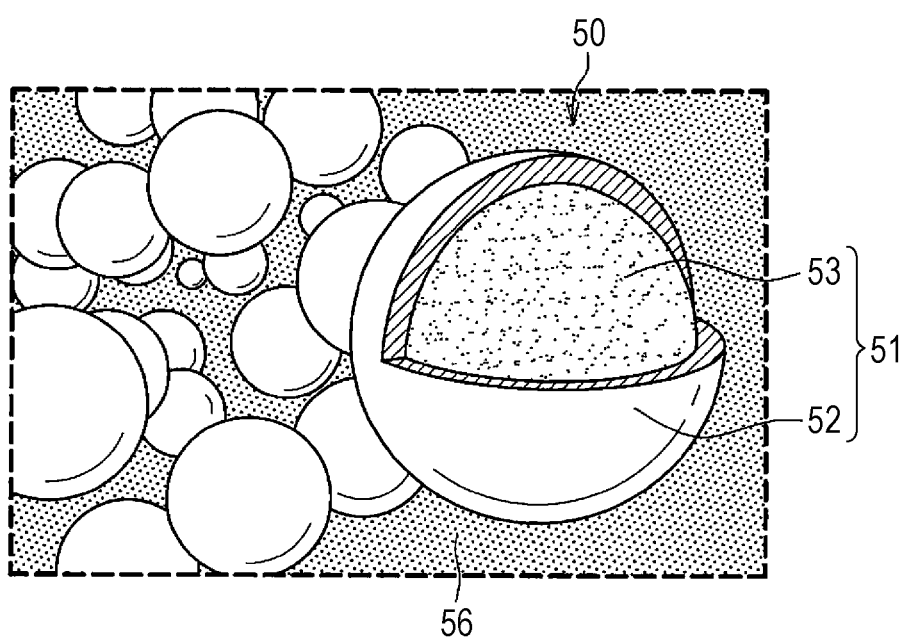
FIG. 2B illustrates the configuration of a thermally expandable material used in the thermally expandable layer of the sheet material.

As illustrated in FIG. 2A, the sheet material 40 includes the thermally expandable layer 42, an inkjet layer 43, and a microfilm 44 on a base material layer 41 (base material).

The base material layer 41 (base material) is made of paper or a resin such as polyethylene terephthalate (PET). The base material layer 41 preferably is heat resistant. In addition, the base material layer 41 preferably is appropriately flexible.

The thermally expandable layer 42 is a layer that expands by being heated.

The inkjet layer 43 is a layer to which an ink is applied.

The microfilm 44 is a layer on which the photothermal conversion ink 45 (see FIG. 3A) is printed (coated).

As illustrated in FIG. 2B, a thermally expandable ink 50, which is a thermally expandable material, is used for the thermally expandable layer 42. The thermally expandable ink 50 includes microcapsules 51 mixed in a binder 56.

The binder 56 is made of an emulsion of a resin material. An emulsion is a substance in which both a dispersion medium and dispersoid are in a liquid state.

The microcapsule 51 includes a shell 52 and a core 53 as a thermally expandable component contained in the shell 52. In FIG. 2B, about one-quarter of the shell 52 on the near side is cut to illustrate the core 53 contained therein. The shell 52 is made of, for example, an acrylonitrile copolymer which is a thermoplastic resin. The core 53 is made of, for example, liquid low-boiling point hydrocarbon, and is thermally expandable.

As used herein, "thermoplastic" means plastically deformable by heating while being pressed. Further, "thermally expandable" means expandable by heating.

<Step of Forming Expanding Portion of Sheet Material>

A step of forming an expanded portion of the sheet material 40 is described below with reference to FIGS. 3A to 3D. FIG. 3A to FIG. 3D illustrate steps of forming the expanding portion of the sheet material 40 by changing cross-sectional views of the sheet material 40.

Figure 3A:
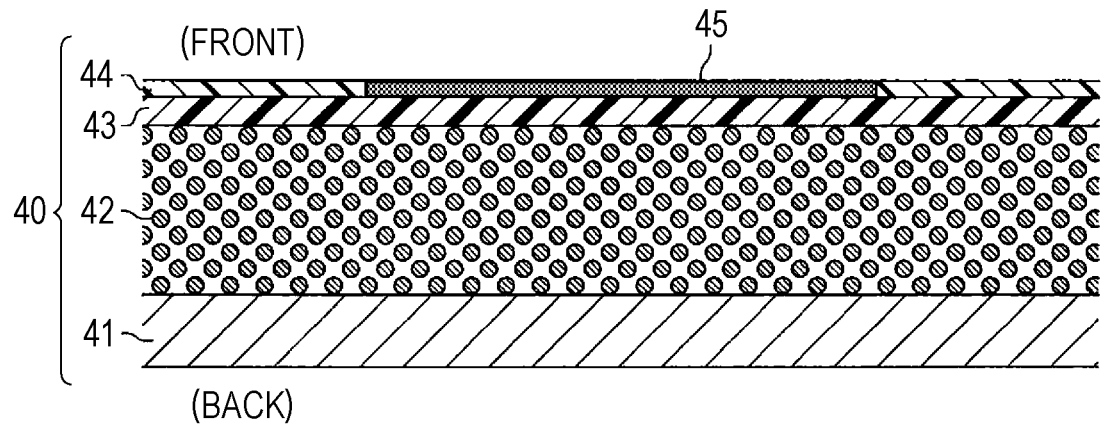
FIG. 3A illustrates a step (1) of forming an expanding portion of the sheet material.

The creator sets the sheet material 40 in an inkjet printer which is not illustrated. Then, the creator prints (applies) the photothermal conversion ink 45 by the printer, which is not illustrated, on a portion of the microfilm 44 where the thermally expandable layer 42 is desired to be expanded, as illustrated in FIG. 3A. The photothermal conversion ink 45 is a black ink containing carbon black. The photothermal conversion ink 45 absorbs light (electromagnetic wave) and converts the absorbed light into heat.

Figure 3B:
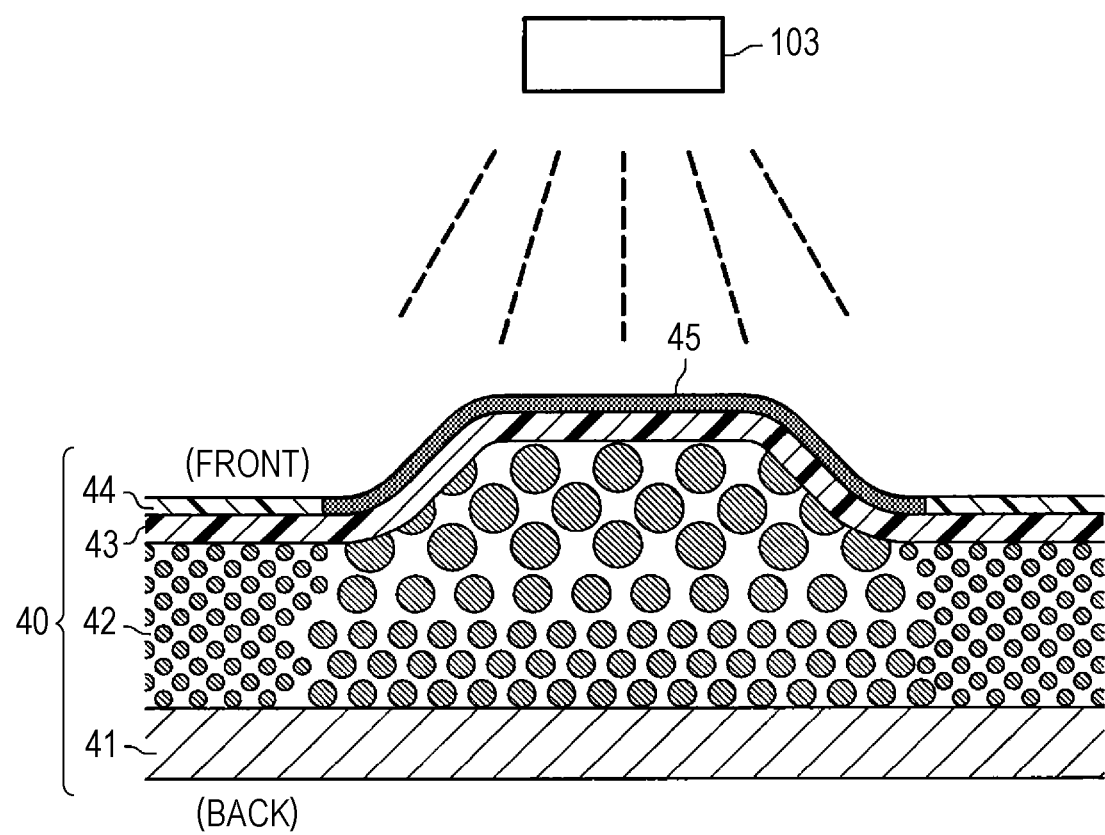
FIG. 3B illustrates a step (2) of forming the expanding portion of the sheet material.

Next, as illustrated in FIG. 3B, the creator disposes the sheet material 40, on which the photothermal conversion ink 45 is printed, in the vicinity of a heating device 103 (heat source) and irradiates the sheet material 40 with light (electromagnetic wave) by the heating device 103. The heating device 103 (heat source) is formed, for example, by a halogen heater. When the sheet material 40 is irradiated with light from the heating device 103, the photothermal conversion ink 45 converts the light into heat. Then, the thermally expandable layer 42 partially expands under the portion where the photothermal conversion ink 45 is printed in response to the heat. The expanding portion is thus formed on the sheet material 40.

Figure 3C:
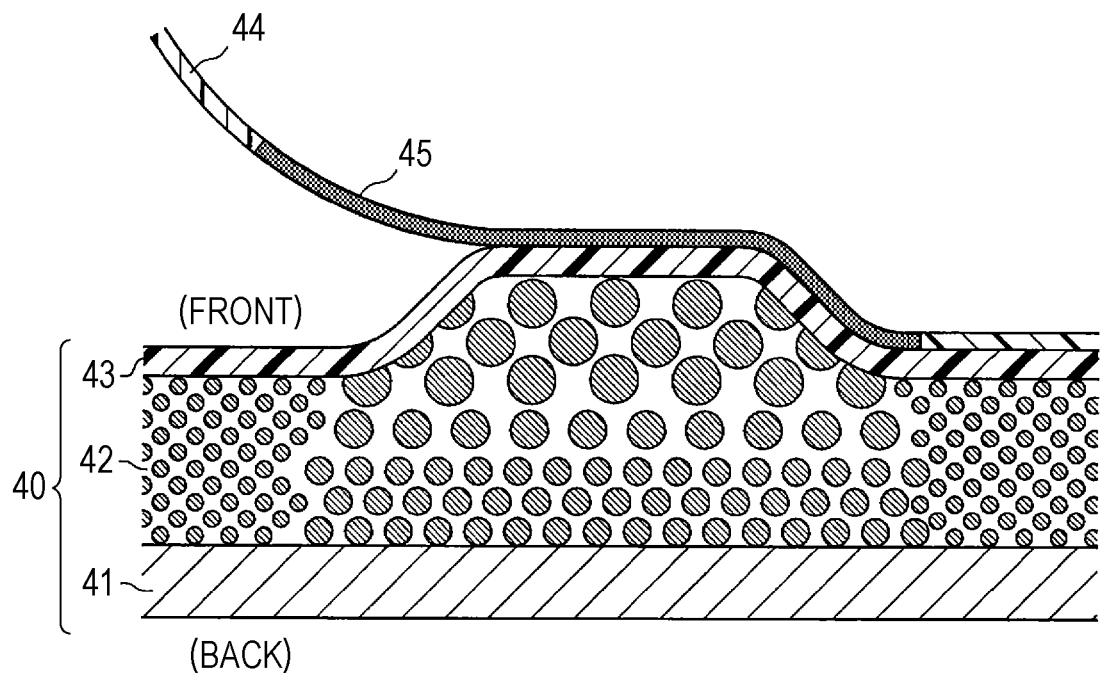
FIG. 3C illustrates a step (3) of forming the expanding portion of the sheet material.
Figure 3D:
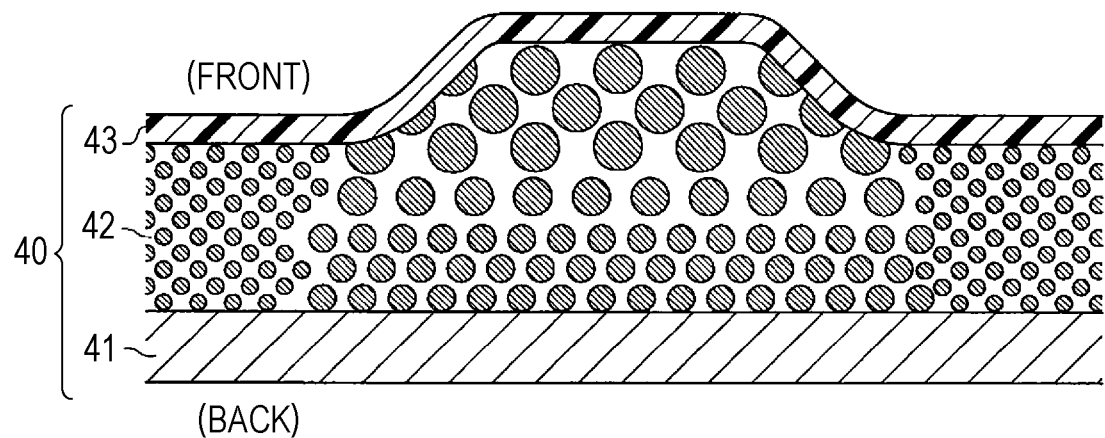
FIG. 3D illustrates a step (4) of forming the expanding portion of the sheet material.

Next, as illustrated in FIG. 3C, the creator peels off and removes the microfilm 44 from the inkjet layer 43. As illustrated in FIG. 3D, the creator has the inkjet layer 43 exposed.

By using such a sheet material 40, the creator can create a circuit board on which the conductive circuit 30 (see FIG. 1C) is formed, for example, by the following steps.

<Steps of Forming Conductive Circuit>

Hereinafter, the process of forming the conductive circuit 30 will be described with reference to FIGS. 4A to 4F. FIGS. 4A to 4F illustrate steps of forming the conductive circuit 30.

Figure 4A:
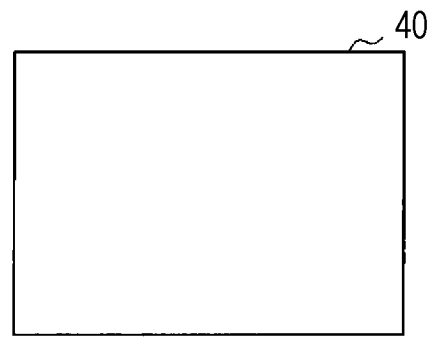
FIG. 4A illustrates a step (1) of forming a conductive circuit according to the embodiment.

For example, as illustrated in FIG. 4A, first, the creator prepares a plain sheet material 40, and sets the sheet material 40 in an inkjet printer (not illustrated).

Figure 4B:
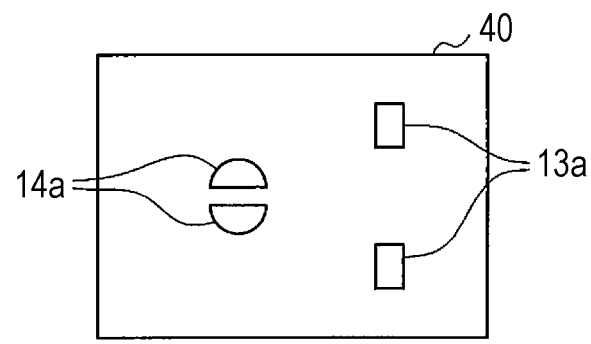
FIG. 4B illustrates a step (2) of forming the conductive circuit according to the embodiment.

Next, as illustrated in FIG. 4B, the creator causes the printer (not illustrated) to print the photothermal conversion ink 45 on the sheet material 40, and print the connection terminals 13a and the switches 14a on the sheet material 40.

Figure 4C:
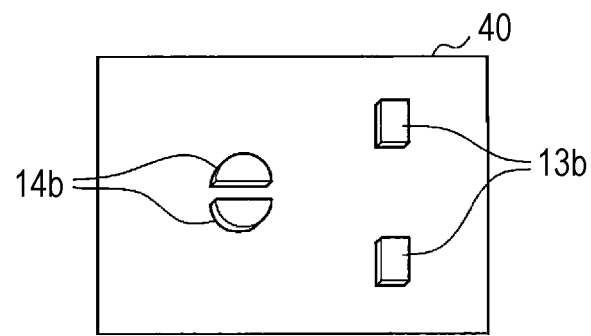
FIG. 4C illustrates a step (3) of forming the conductive circuit according to the embodiment.

Next, the creator sets the sheet material 40 in the heating device 103 (see FIG. 3B), and irradiates the sheet material 40 with light from the heating device 103 (see FIG. 3B). At this time, the photothermal conversion ink 45 of the sheet material 40 converts light into heat. As a result, the printed portion of the photothermal conversion ink 45 (in the illustrated example, the printed portions of the connection terminals 13a and the switches 14a in FIG. 4B) generate heat. As a result, as illustrated in FIG. 4C, the printed portions of the connection terminals 13a and the switches 14a in FIG. 4B expand to form the three-dimensional connection terminals 13b and the protrusions 14b on the sheet material 40.

Figure 4D:
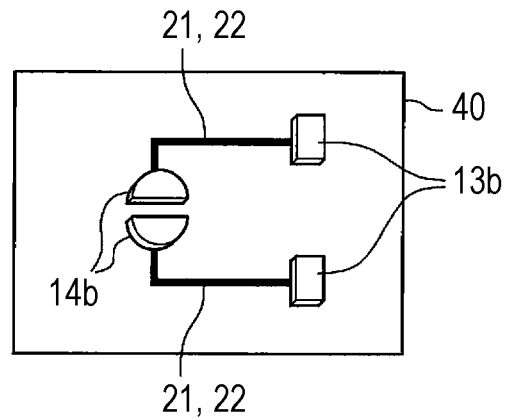
FIG. 4D illustrates a step (4) of forming the conductive circuit according to the embodiment.

Next, the creator sets the sheet material 40 in the inkjet printer which is not illustrated, and causes the printer which is not illustrated to apply the black ink 21 on the sheet material 40. Thus, the wires 22 are printed on the sheet material 40 as illustrated in FIG. 4D. At this time, the wires 22 are printed on portions corresponding to the wires 12 of the electronic circuit diagram 10 (see FIG. 1A).

Figure 4E:
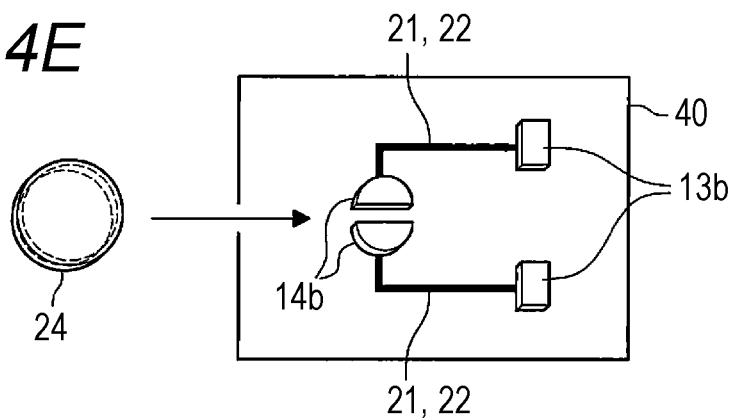
FIG. 4E illustrates a step (5) of forming the conductive circuit according to the embodiment.

Next, the creator disposes the switch member 24 on the protrusions 14b, as illustrated in FIG. 4E. At this time, the switch member 24 is attached to the protrusions 14b with, for example, an adhesive which is not illustrated. Thus, as illustrated in FIG. 4F, the conductive circuit 30 in which the switch member 24 is disposed on the protrusions 14b is created.

Figure 4F:
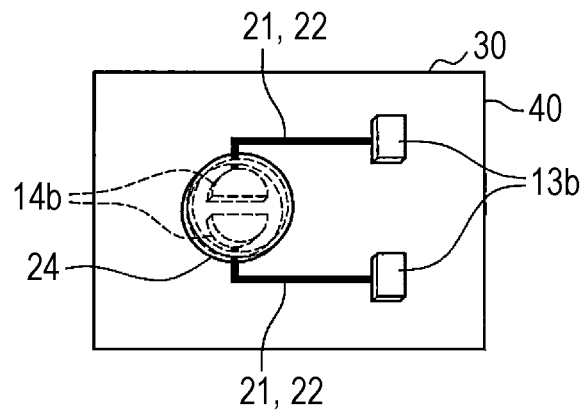
FIG. 4F illustrates a step (6) of forming the conductive circuit according to the embodiment.

In the example illustrated in FIGS. 4E and 4F, the switch member 24 has a hollow cylindrical shape and is supported by the switches 14a. The switches 14a are in the three-dimensional shape, and the switch member 24 is separated from the wires 22. That is, the switches 14a support the switch member 24 so as to be separated from the wires 22.

The connection terminals 13b and the protrusions 14b are three-dimensionally formed by expanding the portions of the sheet material 40 where the connection terminals 13a and the switches 14a are formed. The connection terminals 13a and the switches 14a (especially the switches 14a) are elastic.

The switches 14a are compressed downward by being pressed from above. Accordingly, the switch member 24 is lowered and electrically connected to the wires 22. Thus, in the conductive circuit 30, a current flows between the two connection terminals 13b via the switches 14a.

After that, when the pressing is released, the switches 14a is uncompressed to return to the original state. Accordingly, the switch member 24 is lifted and disconnected from the electrical connection with the wires 22. Thus, the electric current is cut off by the switch 14a in the conductive circuit 30.

The conductive circuit 30 can constitute an operation circuit by disposing, for example, the switch member 24 or electronic components which are not illustrated at desired positions. Such a conductive circuit 30 has, for example, the same wiring function as the flexible wiring board or the universal board.

The creator can use the sheet material 40 in which the conductive circuit 30 is created as a circuit board. The creator can also produce various shapes of the circuit board by separating portions arbitrarily from the sheet material 40.

Figure 5A:
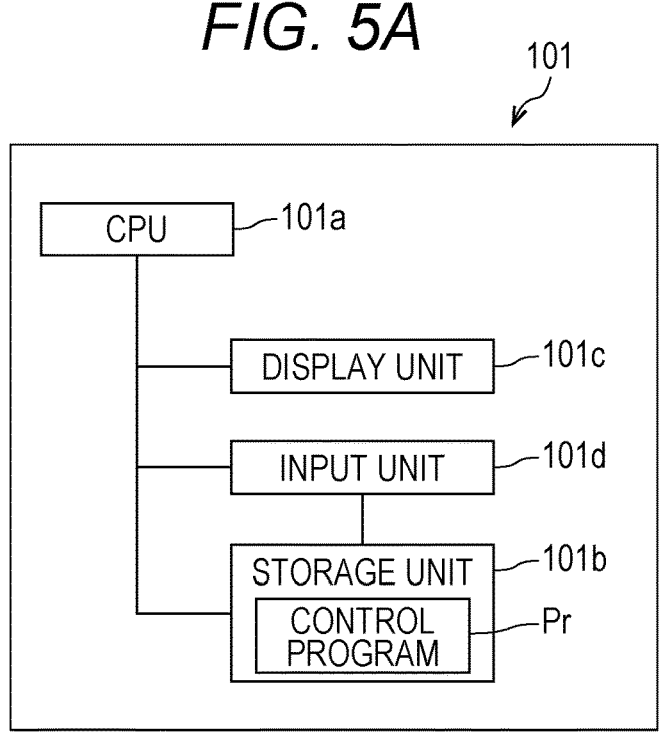
FIG. 5A illustrates an example of a conversion diagram creating device.

The creator can design various patterns of the electronic circuit diagram 10 according to the operation. Then, when creating the conductive circuit 30, the creator causes the computer 101 illustrated in FIG. 5A to function as the conversion diagram creating device to create the conversion diagram 20 corresponding to the electronic circuit diagram 10. FIG. 5A illustrates an example of a conversion diagram creating device.

Figure 5B:
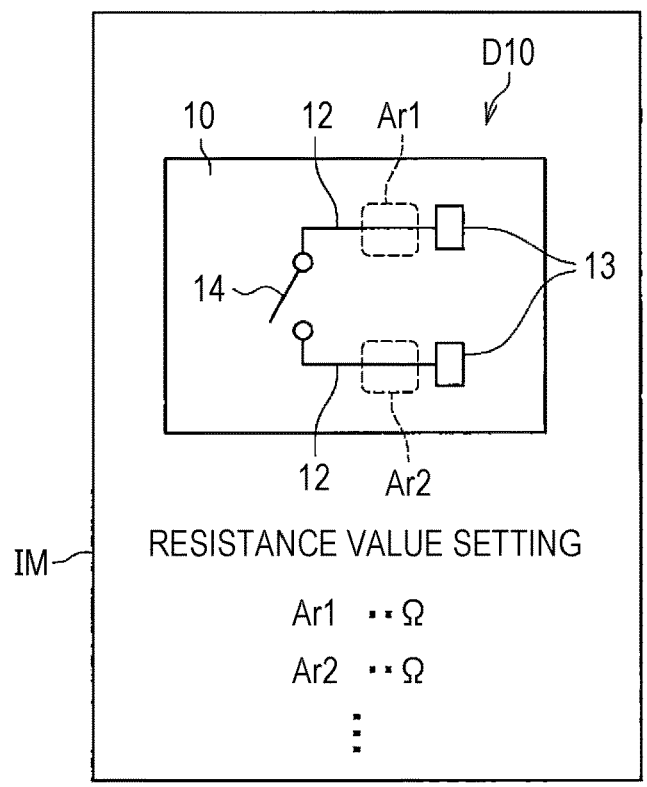
FIG. 5B illustrating an example of an input screen.

The computer 101 as a conversion diagram creating device includes a CPU 101a, a storage unit 101b, a display unit 101c, and an input unit 101d. A control program Pr for creating the conversion diagram 20 from the electronic circuit diagram 10 is installed in advance in the storage unit 101b. The computer 101 creates the conversion diagram 20 from the electronic circuit diagram 10 according to the control program Pr. At this time, as illustrated in FIG. 5B, the creator sets, for example, a resistance value by specifying portions Ar1 and Ar2 corresponding to the wires 12 of the electronic circuit diagram 10 on the input screen IM displayed on the display unit 101c. By doing this, it is possible to form a resistance circuit having a pattern according to the resistance value of the portions Ar1 and Ar2 of the wires 12. FIG. 5B illustrates an example of an input screen IM. The resistance can be set to a desired value by adjusting a line width (thickness), a thickness (density), and a length of the wires 22 made of the black ink 21. Also, the creator can replace or eliminate a part arbitrarily with a different part, or dispose a new part.

Figure 6A:
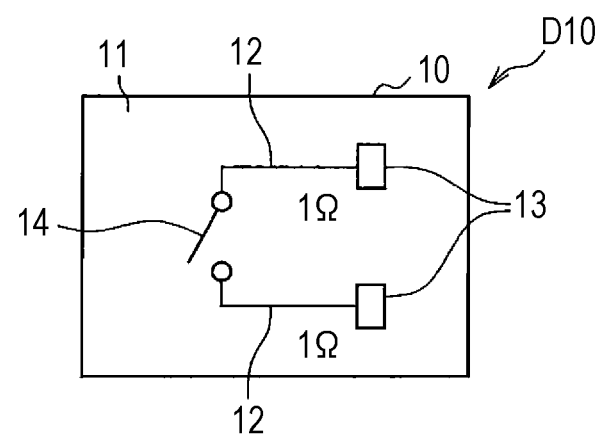
FIG. 6A is an example of an electronic circuit diagram.
Figure 6B:
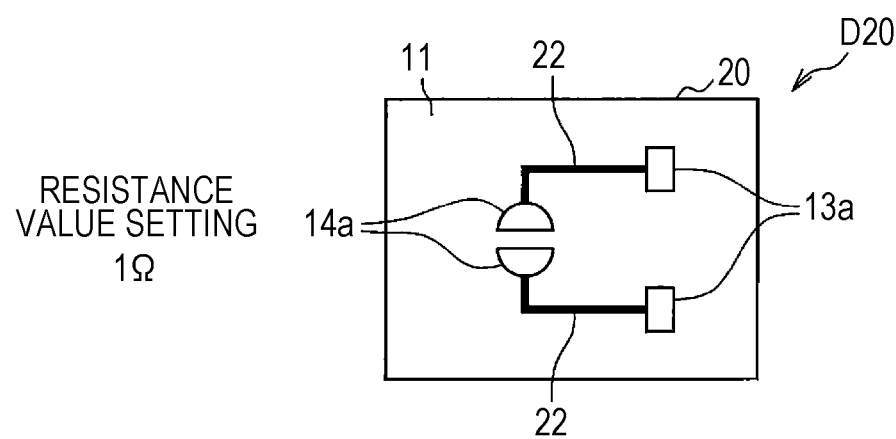
FIG. 6B is an example of a conversion diagram.
Figure 7A:
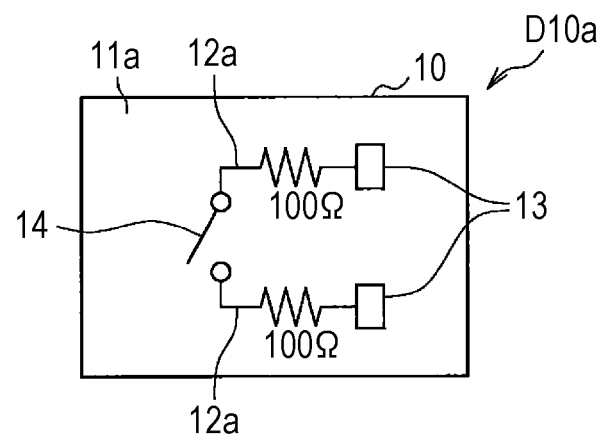
FIG. 7A is an example of an electronic circuit diagram in which a resistance value is changed.
Figure 7B:
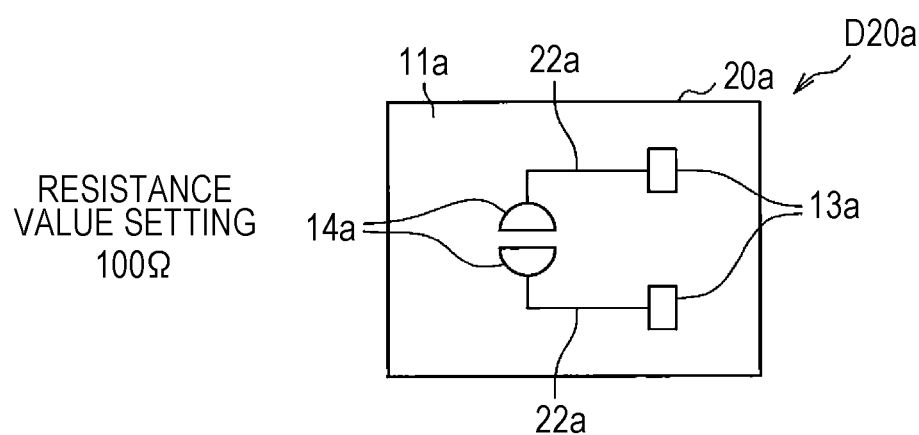
FIG. 7B is an example of a conversion diagram in which the resistance value is changed.

The relationship between the electronic circuit diagram 10 and the conversion diagram 20 is described below with reference to FIGS. 6A to 7B. FIG. 6A illustrates an example of the electronic circuit diagram 10. FIG. 6B illustrates an example of the conversion diagram 20 converted from the electronic circuit diagram 10. FIG. 7A illustrates an example of an electronic circuit diagram 10*a* in which the resistance value is changed. FIG. 7B illustrates an example of a conversion diagram 20*a* converted from the electronic circuit diagram 10*a* in which the resistance value is changed.

For example, the electronic circuit diagram data D10 illustrated in FIG. 6A, the resistance value of the wires 12 is set to 1Ω. As illustrated in FIG. 6B, on the basis of the electronic circuit diagram data D10, the computer 101 creates the conversion diagram data D20 in which the wires 22 are formed with a relatively thick line width (thickness) so as to correspond to the wires 12 having a resistance value 1Ω.

In contrast, in the electronic circuit diagram data D10*a* of FIG. 7A, the creator changes the resistance value of the wires 12 to 100Ω, which is larger than the resistance value of the electronic circuit diagram data D10. In response to this, as illustrated in FIG. 7B, on the basis of the electronic circuit diagram data D10*a*, the computer 101 creates conversion diagram data D20*a* in which the wires 22*a* are formed with a relatively thin line width (thickness) thinner than the wires of the conversion diagram data D20 so as to correspond to the wires 12*a* having a resistance value 100Ω. The wires 22*a* indicate the shape of the wires (wire forming portion) made of the black ink 21.

The computer 101 can create the conversion diagram data D20 in which the line width (boldface), the thickness (density), and the length can automatically be set in accordance with the resistance value of the wires 12 set by the creator.

Figure 8A:
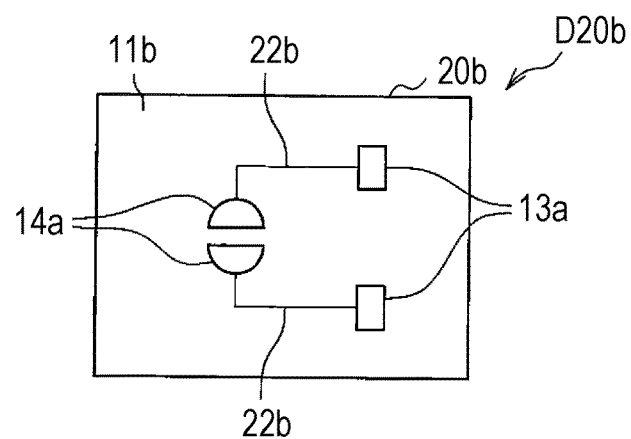
FIG. 8A is an example of creating a conversion diagram (1) according to a resistance value.
Figure 8B:
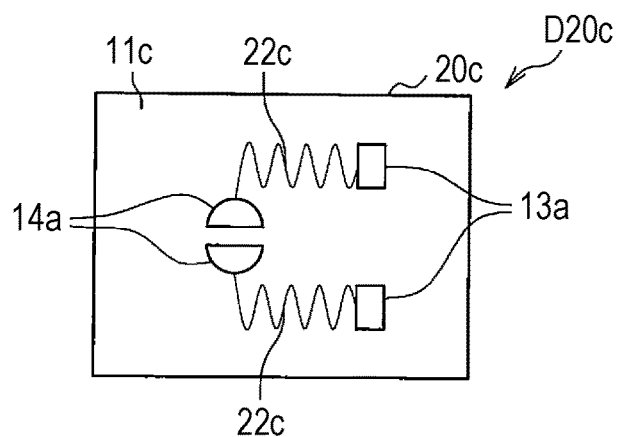
FIG. 8B is an example of creating a conversion diagram (2) according to a resistance value.

With reference to FIG. 8A and FIG. 8B, an example of creating the conversion diagram 20 according to the resistance value is described. FIGS. 8A and 8B illustrate examples of creating the conversion diagrams 20*b* and 20*c*, respectively, according to the resistance value.

For example, in the example illustrated in FIG. 8A, the resistance value of the wires 12 is set to 1000Ω, which is larger than the resistance value of the conversion diagram data D20*a* (see FIG. 7B). Therefore, in the computer 101 creates conversion diagram data D20*b* in which wires 22*b* are formed with a thinner line width (thickness) and a smaller thickness (low density) than the wires of the conversion diagram data D20*a* (see FIG. 7B), so as to correspond to the wires 12 having a resistance value 1000Ω. The wires 22*b* indicate the shape of the wires (wire forming portions) made of the black ink 21.

Further, for example, in the example illustrated in FIG. 8B, the resistance value of the wires 12 is set to 10000Ω which is even larger than the resistance value of the conversion diagram data D20*b* (see FIG. 8A). Therefore, the computer 101 creates conversion diagram data D20*c* in which wires 22*c* are formed longer than the wires of the conversion diagram data D20*b* (see FIG. 8A) so as to correspond to the wires 12 having a resistance value 10000Ω. The wires 22*c* indicate the shape of the wires (wire forming portions) made of the black ink 21. In the conversion diagram data D20*c*, the length of the wires of the wires 22 is extended, and the resistance value of the wires 22 is set to a high value.

Figure 9:
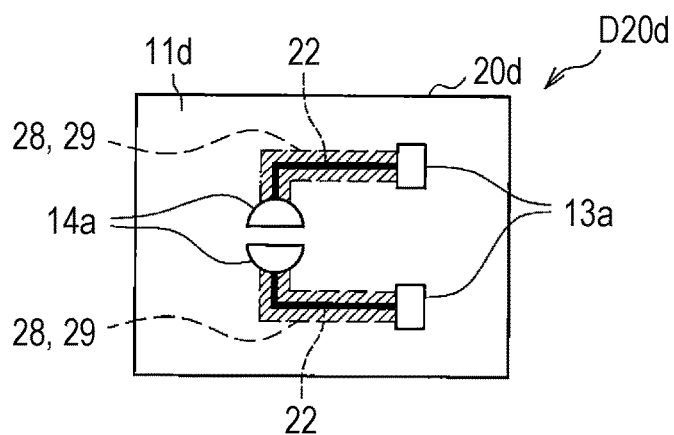
FIG. 9 is an example of a conversion diagram in which a protective film forming region is set.

Meanwhile, in the example illustrated in FIG. 4F, the wires 22 serving as the conductors in the conductive circuit 30 are exposed. Preferably, therefore, the conductive circuit 30 is configured to prevent short-circuit of the wires 22 when metal or the like is placed on the wires 22. To achieve this, as illustrated in FIG. 9, the conductive circuit 30 preferably includes a protective film 29 which is made of an insulating color ink 28 (insulating ink) and formed on each wire 22. FIG. 9 illustrates an example of a conversion diagram 20*d* including a protective film forming region set for the protective film 29. The computer 101 creates the conversion diagram 20*d* in which the protective film forming region of the protective film 29 is automatically determined on the basis of the electronic circuit diagram data D10, and creates conversion diagram data D20*d* that represents the conversion diagram 20*d*. The protective film 29 is formed, for example, by layering and printing the color ink 28 by a printer which is not illustrated. The protective film 29 functions as an insulating layer to prevent short-circuit of the wires 22 when metal or the like is placed on the wires 22. In the example illustrated in FIG. 9, the conversion diagram 20*d* is configured so that the protective film 29 is formed on the entire portion of the wires 22. However, the computer 101 can also create a conversion diagram 20*d* in which the protective film 29 is formed only on a part of the wires 22.

In addition, for example, the creator can create a single circuit board by stacking a plurality of conductive circuits 30 vertically.

Figure 10:
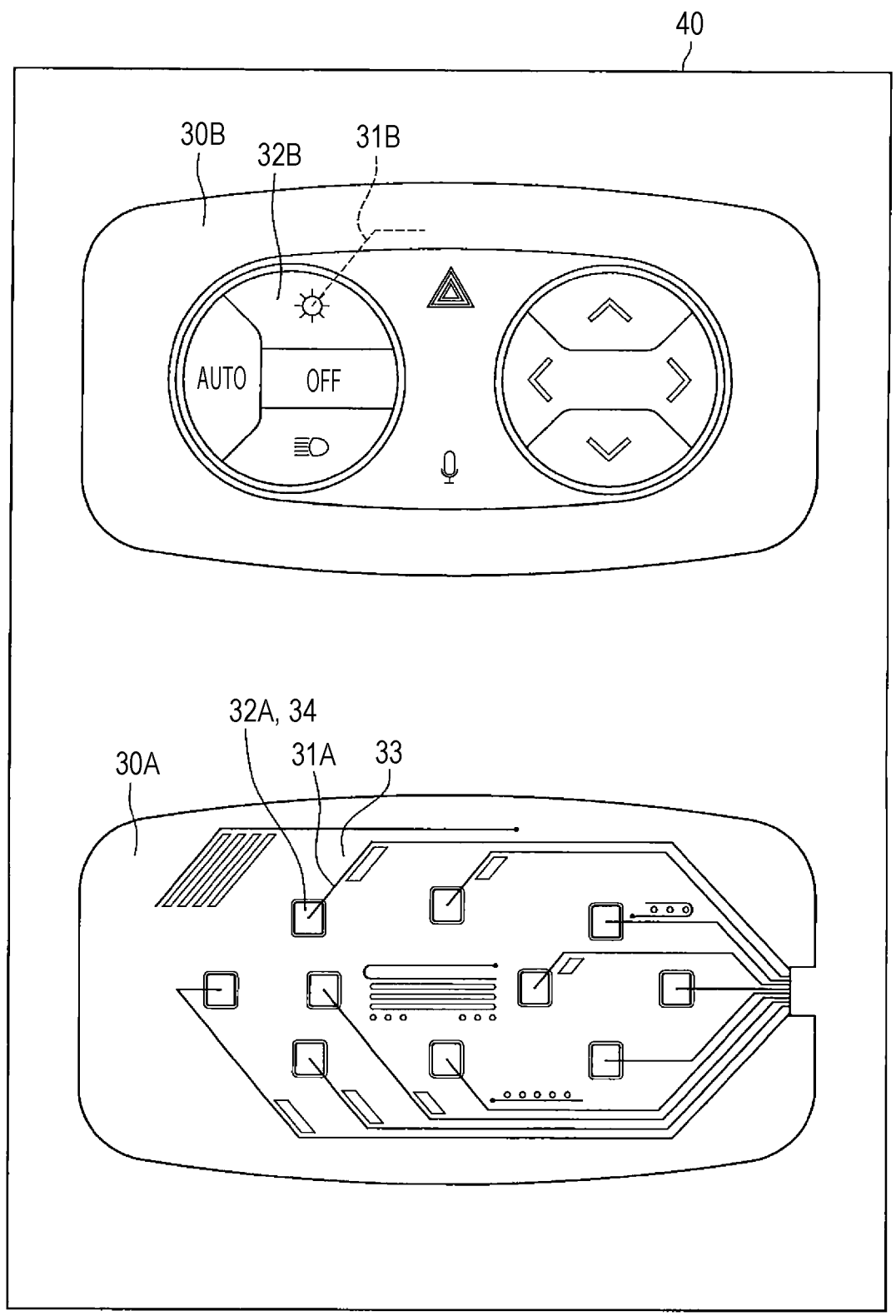
FIG. 10 is an explanatory view in the case of producing a circuit board by combining a plurality of conductive circuits.

Producing the circuit board by combining a plurality of conductive circuits 30 is described below with reference to FIG. 10. FIG. 10 is an explanatory view of a case where a plurality of conductive circuits 30 is combined to form a circuit board.

For example, in the example illustrated in FIG. 10, a conductive circuit 30A and a conductive circuit 30B are formed on a single sheet of the sheet material 40. The creator can separate the conductive circuits 30A and 30B from the sheet material 40 and stack the conductive circuits 30A and 30B to form the single circuit board. The conductive circuit 30A is a plate disposed on the lower side, while the conductive circuit 30B is a plate disposed on the upper side.

In the example illustrated in FIG. 10, a recess 32A is formed on the surface of the conductive circuit 30A. The recess 32A is formed by expanding the thermally expandable layer 42 (see FIG. 3B) around the recess 32A. A wire 31A is formed on the surface of the conductive circuit 30A. The wire 31A indicates the shape of a wire (wire forming portion) formed by printing with the black ink 21 (see FIG. 1B) on the surface of the sheet material 40 by a printer which is not illustrated. In addition, a protective film 33 is formed on the surface of the conductive circuit 30A other than the recess 32A. The protective film 33 is formed by printing with an insulating transparent ink by a printer (not illustrated). In this configuration, the recess 32A is a conductor exposed portion 34.

Further, a wire 31B is formed on the back surface of the conductive circuit 30B. The wire 31B indicates the shape of a wire (wire forming portion) formed by printing the black ink 21 (see FIG. 1B) on the back surface of the sheet material 40 by a printer (not illustrated). Further, a pressing portion 32B and other switches are formed on the surface of the conductive circuit 30B. The pressing portion 32B and the other switches are formed by printing with the insulating color ink 28 (see FIG. 9) by a printer which is not illustrated.

In the circuit board, the pressing portion 32B is disposed on the recess 32A which is the conductor exposed portion 34 by stacking the conductive circuit 30B on the conductive circuit 30A. In the circuit board, when the pressing portion 32B is pressed, the wire 31B formed on the back surface of the conductive circuit 30B and the wire 31A formed on the surface of the conductive circuit 30A become conducted.

In this configuration, the conductive circuit 30 can be created only by printing the desired pattern corresponding to the conversion diagram 20 with the black ink 21 on the sheet material 40. Such a conductive circuit 30 can be made inexpensively with a low-cost material. Further, the conductive circuit 30 can be easily created in a short time.

The conductive circuit 30 can be formed by using general-purpose equipment (e.g., a computer 101 (see FIG. 5A), a printer (not illustrated), a heating device 103 (see FIG. 3B), and so on) without using dedicated machines. Therefore, such a conductive circuit 30 can decrease the production cost.

Further, the conductive circuit 30 can be created without an operation step such as soldering. Therefore, the conductive circuit 30 can reduce the burden of the creator during forming the conductive circuit 30. Further, many conductive circuits 30 can be produced quickly.

Since the conductive circuit 30 is inexpensive, the creator can form a small amount of different types of conductive circuits 30. Therefore, the creator can produce several types of conductive circuits 30 as prototypes of a circuit used for a product under development, and executes various tests using the produced conductive circuits 30.

Meanwhile, the control program Pr described above may cause the computer to manage the conductive line pattern and the expansion pattern. In forming the conductive line pattern on the expanding portion by the computer on the basis of the electronic circuit diagram data, the control program Pr, which is described above, may correct the thickness of the conductive line pattern or the density of the conductive ink that forms the conductive line pattern.

Figure 11A:
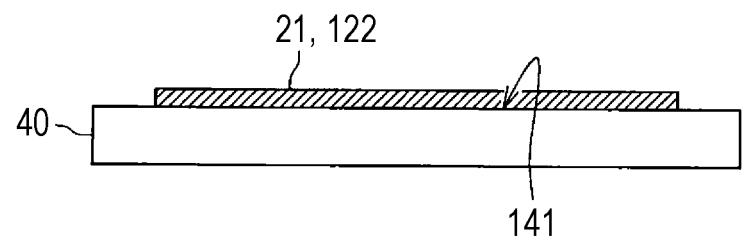
FIG. 11A is an explanatory view in a case where a conductive line pattern is formed on a flat portion.

For example, as illustrated in FIG. 11A, it is assumed that a conductive line pattern 122 is formed with the conductive ink (black ink 21) on the top surface of the sheet material 40. FIG. 11A is an explanatory view of the case where the conductive line pattern 122 is formed on a flat portion 141. In the example illustrated in FIG. 11A, the conductive line pattern 122 is formed on the flat portion 141 that is not intended to be expanded.

Figure 11B:
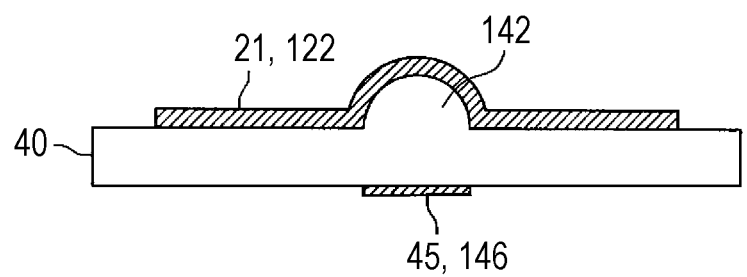
FIG. 11B is an explanatory view in a case where a conductive line pattern is formed on the expanding portion.

Further, as illustrated in FIG. 11B, it is assumed, for example, that the conductive line pattern 122 is formed with the conductive ink (black ink 21) on the top surface of the sheet material 40, the gray scale image 146 is printed with the photothermal conversion ink 45 on the bottom surface of the sheet material 40, and the bottom surface of the sheet material 40 is irradiated with light to form an expanding portion 142 where the gray scale image 146 is printed. FIG. 11B is an explanatory view of the case where the conductive line pattern 122 is formed on the expanding portion 142. In the example illustrated in FIG. 11B, the conductive line pattern 122 is also formed on the expanding portion 142 which is intended to be expanded, in addition to the flat portion 141. The gray scale image 146 is an image representing the expanding pattern of the sheet material 40. In the example illustrated in FIG. 11B, a portion of the gray scale image 146 is printed to overlap the conductive line pattern 122.

As used herein, the conductive ink (black ink 21) is a conductive material for forming the wiring portion by printing. The photothermal conversion ink 45 is a photoconversion material for converting light into heat. The conductive line pattern 122 is an image (which may be referred to as a "first image" hereinafter) printed with the conductive material for forming the wiring portion. The gray scale image 146 is an image (which may be referred to as a "second image" hereinafter) printed with the photothermal conversion material for converting light into heat.

Preferably, the expansion pattern controlled by the control program Pr mentioned above includes density data. This is because, in correcting the conductive line pattern corresponding to the expansion pattern, a distance of the conductive line pattern tends to increase as a height of expansion of the expansion pattern increases, thus making the density of the expansion pattern (i.e., the height of expansion) more important.

The expansion pattern controlled by the control program Pr mentioned above may include data of the height of expansion corresponding to the density. This is because a possible expansion of the conductive line pattern can often be found when the height of expansion is known, and it is easy to find how the conductive line pattern is corrected.

As apparent from FIG. 11B, when the conductive line pattern 122 is formed on the expanding portion 142, the conductive line pattern 122 extends in distance according to the amount of expansion of the expanding portion 142. Therefore, the resistance value of the conductive line pattern 122 increases by the increase of the distance. Therefore, while the computer is made to form the conductive line pattern 122 on the expanding portion 142, the control program Pr increases the thickness of the conductive line pattern 122 according to the increase in the resistance value of the conductive line pattern 122, or increases the density of the conductive ink that makes the conductive line pattern 122. Such correction can be performed by managing the conductive line pattern and the expansion pattern by the computer to determine whether the conductive line pattern overlaps the expanding portion. To determine how the conductive line pattern overlaps or does not overlap the expanding portion, the computer can check, for example, positional information of the expanding portion relative to the positional information of the conductive line pattern, as the pattern data may individually include such positional information.

Figure 12A:
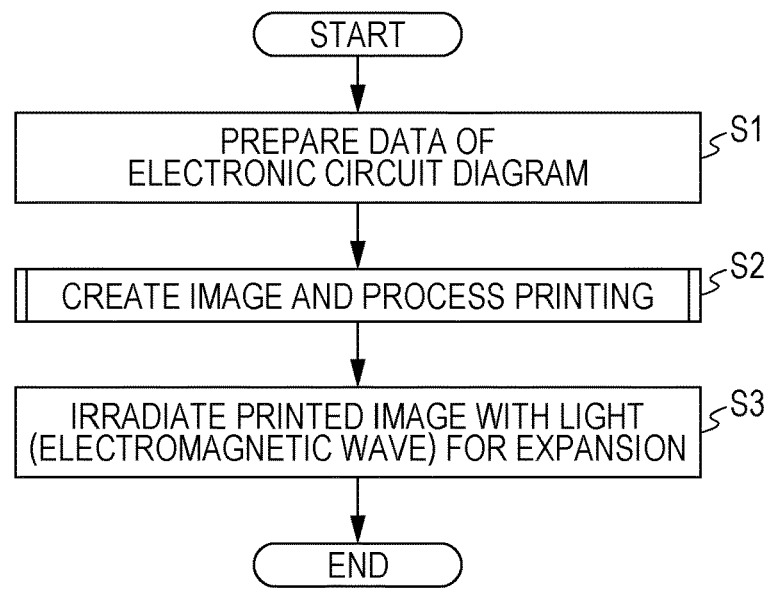
FIG. 12A is a flowchart illustrating a method of forming a conductive circuit.
Figure 12B:
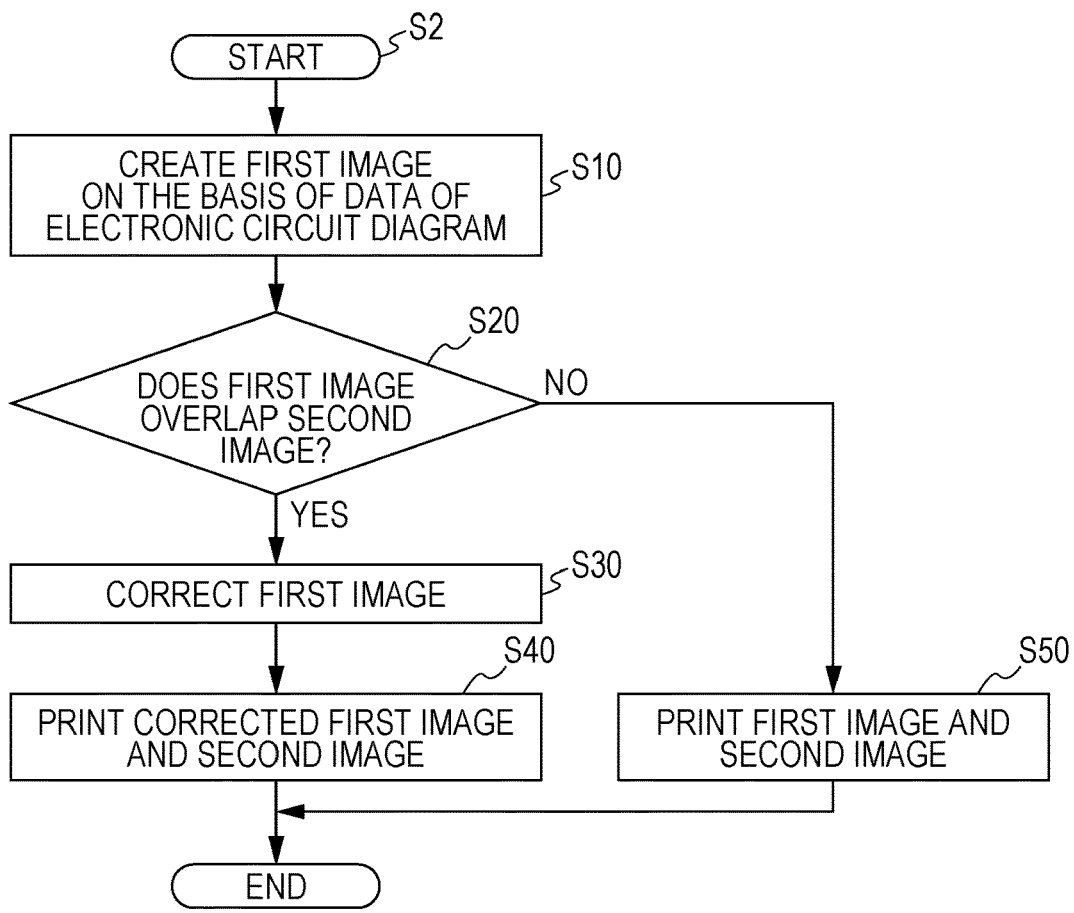
FIG. 12B is a flowchart illustrating detailed process steps of forming an image and printing.
Figure 13A:
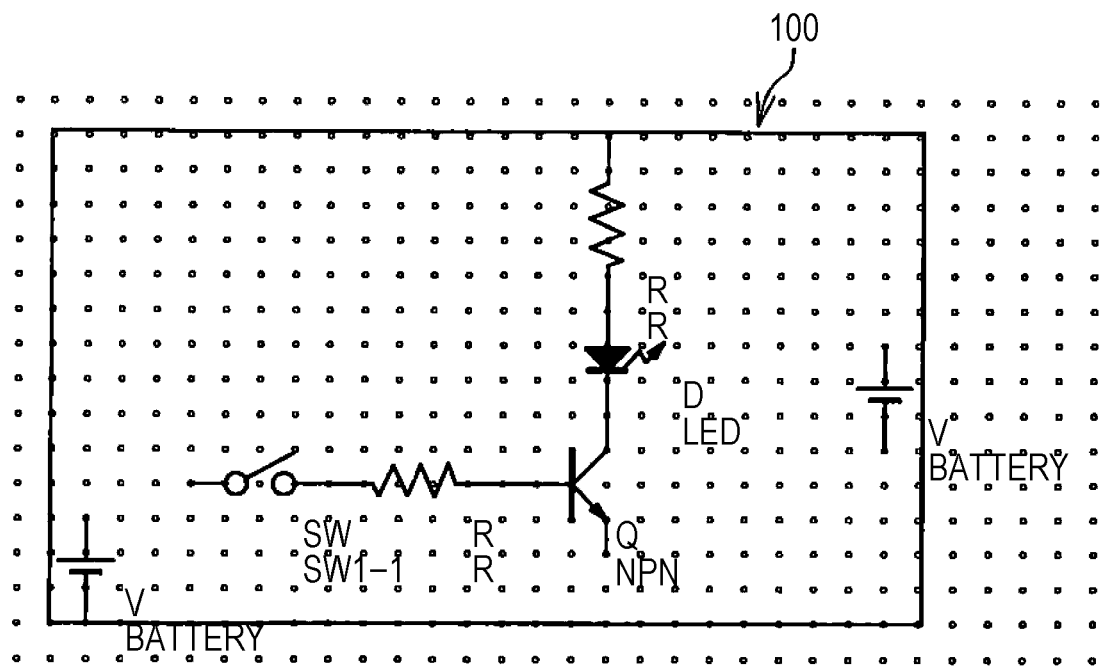
FIG. 13A illustrates an example of an electronic circuit diagram.
Figure 13B:
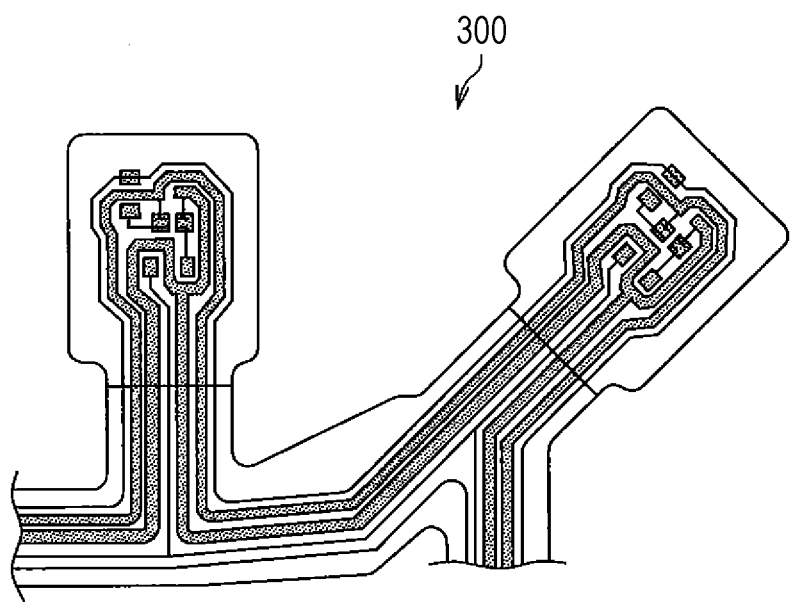
FIG. 13B illustrates an example of a flexible wiring board.

With reference to FIGS. 12A and 12B, a method of forming a conductive circuit is described. FIG. 12A is a flowchart illustrating a method of forming a conductive circuit. FIG. 12B is a flowchart illustrating detailed process steps of forming and printing an image in step S2 of FIG. 12A. The conductive circuit is formed, for example, by process steps S1 to S3 of FIG. 12A.

As illustrated in FIG. 12A, the creator of the conductive circuit first operates the computer 101 (see FIG. 5A) functions as a conversion diagram creating device to prepare electronic circuit diagram data (step S1). The electronic circuit diagram data is previously generated by a computer, which is not illustrated, by a designer of the circuit. The electronic circuit diagram data includes a predetermined resistance value of the wiring portion of the conductive circuit. The creator of the conductive circuit intends to store the electronic circuit diagram data in the computer 101 (see FIG. 5A) using the communication line or a storage medium to prepare the electronic circuit diagram data. The computer 101 (see FIG. 5A) executes the control program Pr mentioned above and functions as a conversion diagram creating device.

Next, the creator of the conductive circuit uses the computer 101 (see FIG. 5A) and a printer which is not illustrated to form and print an image (step S2). In the processing of step S2, the creator of the conductive circuit first operates the computer 101 (see FIG. 5A), which is the conversion diagram creating device, to instruct forming of the conductive circuit. The operation of the conversion diagram creating device starts. In the following, the processing of step S2 is described by referring to FIG. 12B.

As illustrated in FIG. 12B, the conversion diagram creating device generates a first image on the basis of the electronic circuit diagram data (step S10). At this time, the conversion diagram creating device performs a conversion step for converting the electronic circuit diagram into a first image in a manner that the portion of the wiring portion to be formed with the conductive ink is formed in a pattern corresponding to the resistance value of the wiring portion. The first image is an image for forming the wiring portion by printing with the conductive material (black ink 21), and corresponds to a conductive line pattern 122 in the example of FIG. 11A or 11B.

Next, the conversion diagram creating device determines whether or not the first image overlaps the second image (step S20). The second image is an image printed with a photothermal conversion material (photothermal conversion ink 45) which corresponds to the gray scale image 146 in the example illustrated in FIG. 11B.

If it is determined in step S20 that the first image overlaps the second image ("Yes"), the conversion diagram creating device corrects the first image (step S30). At this time, the conversion diagram creating device performs a correction step of correcting the first image so that a degree of increase of the printed amount of the photothermal conversion material, which is printed as the first image, corresponds to a degree of increase of the surface area of the thermally expandable layer 42 (see FIG. 2A) when the thermally expandable layer 42 is thermally expanded as the second image is irradiated with light.

After step S30, the conversion diagram creating device causes a printer, which is not illustrated and in which the sheet 40 is set, to print the corrected first image and the second image on the sheet 40 (step S40).

If it is determined in step S20 that the first image does not overlap the second image (No), the conversion diagram creating device causes the printer, which is not illustrated and in which the sheet 40 is set, to print the first image and the second image on the sheet 40 (step S50).

Subsequently, the process returns to FIG. 12A and the creator of the conductive circuit sets the sheet 40 in a heating device 103 (see FIG. 3B) to irradiate the printed image of the sheet 40 with light (electromagnetic light) from the heating device 103 and to expand the portion of the sheet 40 where the image is printed (S3). The conductive circuit is thus formed.

In the present embodiment, the control program Pr is configured to cause the computer to perform the following operations.

(1) The control program Pr is configured to cause the computer to create, on the basis of the electronic circuit diagram data, the conversion diagram data in which a part or all of the wires included in the electronic circuit diagram data is converted to portions to be formed with the conductive ink having conductivity, and form the portions of the wires to be formed with the conductive ink in the pattern according to the resistance value of the wires.

(2) The control program Pr is configured to cause the computer to determine the thickness of the individual portions of the electronic circuit diagram data according to the resistance value of the wires.

(3) The control program Pr is configured to cause the computer to determine the lengths of the individual portions according to the resistance value of the wires included in the electronic circuit diagram data.

(4) The control program Pr is configured to cause the computer to determine the density of the conductive ink at the individual portions according to the resistance value of the wires included in the electronic circuit diagram data.

(5) The control program Pr is configured to cause the computer to determine the region of the protective film to be formed on the wires with the insulating ink having the insulating characteristic on the basis of the electronic circuit diagram data.

(6) The control program Pr causes the computer to manage the conductive line pattern and the expansion pattern, and corrects the thickness of the conductive line pattern or the density of the conductive ink that forms the conductive line pattern, when the conductive line pattern is formed on the expanding portion on the basis of the electronic circuit diagram data.

The control program Pr is preferably a program described below.

(a) The control program Pr is configured such that the computer causes the electronic circuit diagram, in which the resistance value of the wiring portion is defined, to function as the conversion means to convert to the first image for forming the wiring portion printed with the conductive material, and as the correction means to correct the first image on the basis of the second image, when at least a part of the first image overlaps the second image printed with the photothermal conversion material to at least overlaps the thermally expandable layer.

(b) The control program Pr is configured such that the correction means corrects the first image such that the degree of increase of the printed amount of the photothermal conversion material printed as the first image corresponds to the degree of increase of the surface area of the expanding layer when the second image, which is printed to at least partially overlap the thermally expandable layer, is irradiated with the light to thermally expand the thermally expandable layer.

In the item (a) above, the "first image" means the image of the wiring portion made of the conductive material (the conductive line pattern 122 in the example of FIG. 11A or 11B), and the "second image" means the gray scale image (gray scale image 146 in the example of FIG. 11B) which is made of the photothermal conversion material printed to partially expand the thermally expanded layer. The "conductive material" corresponds to the black ink 21 in the present embodiment. Further, the "photothermal conversion material" corresponds to the photothermal conversion ink 45 in the present embodiment.

Further, in the item (b) above, the "degree of increase of the surface area" means a degree of surface irregularity of the surface of the sheet material when becomes somewhat rough due to the expansion of the thermally expandable layer. The item (b) above also includes the correction of the first image (thickness and density of the wiring portion) by not only the irregularity of a stepped portion, when intentionally formed, but also the roughness of the surface of the sheet material when the step is not formed.

As described above, according to the conductive circuit 30 of the present embodiment, it is possible to provide the circuit board having a wiring function similar to the wiring function of the flexible wiring board or the universal board, inexpensive, and capable of being produced quickly and easily.

The present invention is not limited to the above-described embodiment, and various changes and modifications can be made without departing from the scope of the present invention.

For example, the embodiment described above has been described in detail in order to facilitate understanding of the subject matter of the present invention. Therefore, the present invention is not necessarily limited to the one including all the components described. Further, another component may be added to a certain component or some components may be replaced with other components in the present invention. Also, some components may be eliminated in the present invention.

The invention claimed is:

1. A computer readable storage medium having stored thereon a program executable by a computer, the program controlling the computer to execute functions comprising:
    forming a first image in accordance with an electronic circuit diagram, in which a resistance value of a wiring portion is defined, to form the wiring portion by printing with a conductive ink; and
    correcting the first image in accordance with a second image, which is formed with a photothermal conversion material, when the first image is formed at least partially overlapping the second image;
    wherein the second image is an image for expanding a thermally expandable layer that thermally expands with heat and, when the image is irradiated with light, expanding the thermally expandable layer by converting the light into heat using the photothermal conversion material.

2. The computer readable storage medium according to claim 1,
    wherein:
        the correcting includes correcting the first image in a manner such that a degree of increase of a printed amount of the conductive ink, which is printed as the first image, corresponds to a degree of increase of a surface area of the thermally expandable layer when the thermally expandable layer is thermally expanded corresponding to a region of the second image printed at least partially overlapping the thermally expandable layer.

3. The computer readable storage medium according to claim 2, wherein:
    a storage unit stores density data of the photothermal conversion material corresponding to the second image, and
    the correcting of the first image includes adjusting at least one of a thickness of the first image and a density of the conductive ink with which the first image is formed in accordance with the density data.

4. The computer readable storage medium according to claim 3, wherein:
    the storage unit stores height data of expansion of the thermally expandable layer corresponding to the density of the photothermal conversion material corresponding to the second image, and
    the correcting of the first image includes adjusting at least one of the thickness of the first image and the density of the conductive ink that forms the first image in accordance with the density data and the height data.

5. The computer readable storage medium according to claim 4, wherein:
    the correcting includes executing correction to increase at least one of the thickness of the first image and the density of the conductive ink with which the first image is formed in accordance with the density data and the height data.

6. A method of forming a conductive circuit diagram formed on a sheet including a thermally expandable layer that expands with heat, the method comprising:
    preparing a first image for forming a wiring portion by printing with a conductive ink; and
    correcting the first image in accordance with a second image which is printed with a photothermal conversion material, when the first image is formed at least partially overlapping the second image;
    wherein the second image is an image for expanding a thermally expandable layer when the image is irradiated with light.

7. The method of forming the conductive circuit diagram according to claim 6, wherein:
    the correcting includes correcting the first image in a manner such that a degree of increase of a printed amount of the conductive ink that is printed as the first image corresponds to a degree of increase of a surface area of the thermally expandable layer when the thermally expandable layer is thermally expanded corresponding to a region of the second image printed at least partially overlapping the thermally expandable layer.

8. The method of forming the conductive circuit diagram according to claim 7, wherein:
    the correcting includes executing correction to increase at least one of a thickness of the first image and a density of the conductive ink with which the first image is formed, according to an increase of a resistance value of the first image depending on a degree of increase of a surface area of the thermally expandable layer when the thermal expandable layer is thermally expanded.

9. The method of forming the conductive circuit diagram according to claim 6, wherein:
    the correcting includes executing correction to increase at least one of a thickness of the first image and a density of the conductive ink with which the first image is formed, as a degree of irregularity on the surface of the thermally expandable layer increases.

* * * * *